United States Patent
Spehr et al.

(10) Patent No.: US 10,089,355 B2
(45) Date of Patent: Oct. 2, 2018

(54) COMPUTERIZED SYSTEMS AND METHODS FOR PARTITIONING DATA FOR INFORMATION RETRIEVAL

(71) Applicant: MAPQUEST, INC., Denver, CO (US)

(72) Inventors: Darren A. Spehr, Middletown, MD (US); Miria Grunick, New York, NY (US); Antony M. Pegg, East Petersburg, PA (US); Andrew McMahon, Washington, DC (US); Thomas P. Vaccarino, Falls Church, VA (US)

(73) Assignee: Mapquest, Inc., Denver, CO (US)

( * ) Notice: Subject to any disclaimer, the term of this patent is extended or adjusted under 35 U.S.C. 154(b) by 306 days.

(21) Appl. No.: 14/474,263

(22) Filed: Sep. 1, 2014

(65) Prior Publication Data
US 2016/0062998 A1    Mar. 3, 2016

(51) Int. Cl.
  *G06F 17/30* (2006.01)
(52) U.S. Cl.
  CPC .............. *G06F 17/30486* (2013.01)
(58) Field of Classification Search
  CPC ......... G06F 17/30286; G06F 17/30067; G06F 17/30486; G06F 9/5083; G06F 11/3433
  See application file for complete search history.

(56) References Cited

U.S. PATENT DOCUMENTS

| | | | |
|---|---|---|---|
| 7,249,141 B2* | 7/2007 | Agrawal | G06F 17/30595 |
| 8,456,332 B2* | 6/2013 | Shalev | H03M 7/30 341/50 |
| 8,849,749 B2* | 9/2014 | Rishel | 707/609 |

OTHER PUBLICATIONS

Mikhail Vorontsov, Java Performance Tuning Guide, Jun. 26, 2013.*
Salman, Sort an array based on the length of each element, May 17, 2012.*
Roberts, Minimum Entropy Data Partitioning, 1999.*
Linux Information Project, String Definition, Jun. 17, 2007, available at http://www.linfo.org/string.html.*
Fan, Small Cache, Big Effect: Provable Load Balancing for Randomly Partitioned Cluster Services, Oct. 27, 2011.*
Atwood, Calculating entropy of a string, Feb. 20, 2011.*

* cited by examiner

*Primary Examiner* — Robert Beausoliel, Jr.
*Assistant Examiner* — Hau H Hoang

(57) ABSTRACT

Systems and methods are disclosed for partitioning data into n partitions in a database used for information retrieval. According to certain embodiments implemented with at least one processor, a perceived load is determined for each of a plurality of substrings, each of the substrings corresponding to one or more entries in the database. The plurality of substrings are ordered from highest to lowest perceived load. Data associated with each of the first n substrings is assigned to a separate partition, wherein n is greater than one. Moreover, data associated with each of the remaining substrings is assigned to the n partitions based on a score. The score is computed by calculating, for each partition, a load variance and an entropy weight for the candidate substring. The load variance and the entropy weight are combined, and the candidate substring is assigned to the partition that has the lowest combined score.

21 Claims, 4 Drawing Sheets

COMPUTERIZED SYSTEMS AND METHODS FOR PARTITIONING DATA FOR INFORMATION RETRIEVAL

BACKGROUND

Technical Field

The present disclosure generally relates to the field of electronic information retrieval, including the identification and retrieval of point-of-interest information. More specifically, and without limitation, the exemplary embodiments described herein relate to systems and methods for identifying points-of-interest using customized query prediction and execution based on, among other factors, user location and/or other profile data. Computerized systems and methods are also provided for partitioning data for information retrieval.

Background

Electronic mapping has become a useful tool for users to find and navigate to points-of-interest. Users consult electronic maps both to locate known points-of-interest by name or address and to find new points-of-interest that may suit their needs. Electronic mapping applications often include a wealth of point-of-interest information, including business names, phone and address information, hours of operation, reviews, and other useful information. Thus, users may use electronic mapping applications both to find the location and other information about known points-of-interest and discover new points-of-interest that may appeal to them.

In order to enable users to find points-of-interest quickly and efficiently, electronic mapping applications often employ electronic search technology similar to that used for other information retrieval tasks, such as general web searching. However, certain modifications are needed for search algorithms implemented in conjunction with electronic mapping to better to serve the needs to users. For example, query execution and presentation in the electronic mapping context may focus more heavily on the identification and description of points-of-interest that match query terms, rather than on the identification of web pages or other documents that provide detailed information on subjects related to the query terms. Moreover, processing of queries submitted through an electronic mapping application may include analysis of location data corresponding to the user who submitted the query. Thus, query results may be prioritized and presented to the user based on proximity to the user's current location.

Many mobile applications utilize electronic mapping and/or search functionalities. For example, several electronic mapping application providers have developed mobile applications that allow users to access their electronic mapping applications via a mobile phone or tablet. Further, other application developers have incorporated electronic mapping and/or search technology into their applications. For example, applications the facilitate travel accommodations (e.g., car, plane, hotel), restaurant reservations, and general city guides include electronic search and mapping functionalities. Thus, searches conducted on one of these applications may be further refined to include not only location information but also further refinements, such as business type (e.g., restaurant, hotel) and price.

Current systems for providing electronic search functionalities for use with electronic mapping applications suffer from drawbacks or disadvantages that affect their ability efficiently to provide meaningful information to users. For example, current electronic search technologies do not provide adequate customization for client applications in the electronic mapping context. Current systems also take too long to provide users with desired point-of-interest information. For example, users may need to type very detailed search queries or perform numerous queries in order to obtain the desired results. Moreover, the results are not displayed to the user until the user completes the query and even then may not include the information that the user desires to see for a given point-of-interest. Although relevant for any search and/or mapping application, these concerns are particularly relevant in the mobile application context, as users' ability to craft queries is limited by hardware capabilities of mobile devices (e.g., screen or keyboard size).

SUMMARY

Consistent with the present disclosure, systems and methods are provided for identifying points-of-interest using customized query prediction. Embodiments consistent with the present disclosure include computer-implemented systems and methods for predicting a full query based on a partial query received from a client and transmitting search results to the client based on the predicted query. In addition, systems and methods consistent with the present disclosure may distribute data associated with one or more substrings among a plurality of partitions. Embodiments consistent with the present disclosure may overcome one or more of the drawbacks or problems set forth above.

In accordance with one exemplary embodiment, a computer-implemented method is provided for distributing data among n partitions in a database used for information retrieval. The method includes determining a perceived load for each of a plurality of substrings. The plurality of substrings may be ordered from highest to lowest perceived load. Data associated with each of the first n substrings is assigned to a separate partition, wherein n is greater than one. Moreover, data associated with each of the remaining substrings is assigned to the n partitions based on a score. The score may be computed by calculating, for each partition, a load variance and an entropy weight for the candidate substring. The load variance and the entropy weight are combined, and the candidate substring is assigned to the partition that has the lowest combined score.

In accordance with another exemplary embodiment, a system is provided for distributing data among n partitions in a database used for information retrieval. The system includes a memory device that stores a set of instructions and at least one processor in communication with the memory device and configured to execute the set of instructions to perform several operations, including determining a perceived load for each of a plurality of substrings and ordering the plurality of substrings from highest to lowest perceived load. The operations performed by the processor also include assigning data associated with each of the first n substrings to a separate partition, wherein n is greater than one. The processor may also be configured to assign data associated with each of the remaining substrings to the n partitions based on a score. The score is computed by calculating, for each partition, a load variance and an entropy weight for the candidate substring. The load variance and the entropy weight are combined, and the candidate substring is assigned to the partition that has the lowest combined score.

In accordance with yet another exemplary embodiment, a computer readable storage medium is provided including a set of instructions for distributing data among n partitions in a database used for information retrieval. When executed by at least one processor, the set of instructions cause the at least one processor to determine a perceived load for each of a plurality of substrings and order the plurality of substrings from highest to lowest perceived load. The instructions also cause the processor to assign data associated with each of the first n substrings to a separate partition, wherein n is greater than one. Moreover, the instructions cause the processor to assign data associated with each of the remaining substrings to the n partitions based on a score. The score is computed by calculating, for each partition, a load variance and an entropy weight for the candidate substring. The load variance and the entropy weight are combined, and the candidate substring is assigned to the partition that has the lowest combined score.

Before explaining certain embodiments of the present disclosure in detail, it is to be understood that the disclosure is not limited in its application to the details of construction and to the arrangements of the components set forth in the following description or illustrated in the drawings. The disclosure is capable of embodiments in addition to those described and of being practiced and carried out in various ways. Also, it is to be understood that the phraseology and terminology employed herein, as well as in the abstract, are for the purpose of description and should not be regarded as limiting.

As such, those skilled in the art will appreciate that the conception and features upon which this disclosure is based may readily be utilized as a basis for designing other structures, methods, and systems for carrying out the several purposes of the present disclosure. Furthermore, the claims should be regarded as including such equivalent constructions insofar as they do not depart from the spirit and scope of the present disclosure.

BRIEF DESCRIPTION OF THE DRAWINGS

The accompanying drawings, which are incorporated in and constitute part of this specification, and together with the description, illustrate and serve to explain the principles of various exemplary embodiments.

DETAILED DESCRIPTION OF EXEMPLARY EMBODIMENTS

Figure 1:
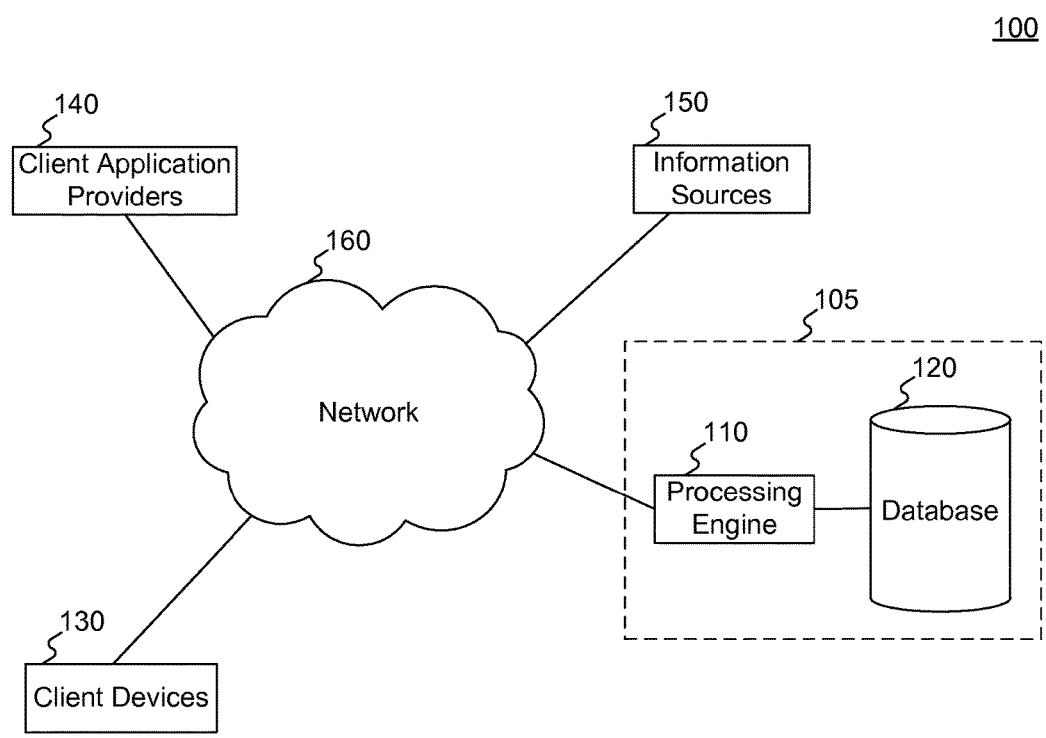
FIG. 1 is a diagram of an exemplary system environment for implementing embodiments consistent with the present disclosure.

Reference will now be made in detail to the exemplary embodiments implemented according to the disclosure, the examples of which are illustrated in the accompanying drawings. Wherever possible, the same reference numbers will be used throughout the drawings to refer to the same or like parts.

Embodiments herein include computer-implemented methods, tangible non-transitory computer-readable mediums, and systems. The computer-implemented methods may be executed, for example, by at least one processor that receives instructions from a non-transitory computer-readable storage medium. Similarly, systems consistent with the present disclosure may include at least one processor and memory, and the memory may be a non-transitory computer-readable storage medium. As used herein, a non-transitory computer-readable storage medium refers to any type of physical memory on which information or data readable by at least one processor may be stored. Examples include random access memory (RAM), read-only memory (ROM), volatile memory, nonvolatile memory, hard drives, CD ROMs, DVDs, flash drives, disks, and any other known physical storage medium. Singular terms, such as "memory" and "computer-readable storage medium," may additionally refer to multiple structures, such a plurality of memories and/or computer-readable storage mediums. As referred to herein, a "memory" may comprise any type of computer-readable storage medium unless otherwise specified. A computer-readable storage medium may store instructions for execution by at least one processor, including instructions for causing the processor to perform steps or stages consistent with an embodiment herein. Additionally, one or more computer-readable storage mediums may be utilized in implementing a computer-implemented method. The term "computer-readable storage medium" should be understood to include tangible items and exclude carrier waves and transient signals.

Embodiments of the present disclosure provide improved systems and methods for providing customized query prediction and execution, including prediction and execution of queries related to points-of-interest. The disclosed embodiments provide location-aware query prediction and/or suggestion, such that a full query may be predicted based on analysis of only a few characters along with location data associated with a user. The disclosed embodiments also provide run-time customization of dictionaries and search strategies used to predict and execute queries in electronic mapping applications. Accordingly, in addition to characters of a query and location information, a client application may send additional parameters to guide the prediction and execution of the query, such as an identification of one or more dictionaries to be searched, a profile containing predefined search strategies, and a priority according to which search results should be provided.

The disclosed embodiments enable a user to obtain relevant search results based on a predicted query before the user finishes typing a full query. According to certain embodiments, the search results provided based on the predicted query contain sufficient detail for the user to be able to identify a desired point-of-interest. Thus, the user does not need to complete and/or submit the full query in order to receive the desired information about a point-of-interest.

FIG. 1 depicts an exemplary system environment 100 for implementing embodiments of the present disclosure. As shown in FIG. 1, system environment 100 includes a number of components. It will be appreciated from this disclosure that the number and arrangement of these components is exemplary and provided for purposes of illustration. Other arrangements and numbers of components may be utilized without departing from the teachings and embodiments of the present disclosure As shown in FIG. 1, the exemplary system environment 100 includes a system 105. System 105 may include one or more server systems, databases, and/or computing systems configured to receive information from entities over a network, process and/or store the information, and transmit the information to other entities over the network. In one embodiment, system 105 may include a processing engine 110 and one or more databases 120, which are illustrated in a region bounded by a dashed line for system 105 in FIG. 1.

In one embodiment, system 105 may transmit and/or receive data to/from various other components, such as one or more client devices 130, client application providers 140, and information sources 150. More specifically, system 105 may be configured to receive and store data transmitted over an electronic network 160 (e.g., comprising the Internet) from various data sources, including client devices 130, client application providers 140, and information sources 150, process the received data, and transmit search results based on the processing to client devices 130.

The various components of system environment 100 may include an assembly of hardware, software, and/or firmware, including a memory, a central processing unit ("CPU"), and/or a user interface. Memory may include any type of RAM or ROM embodied in a physical storage medium, such as magnetic storage including floppy disk, hard disk, or magnetic tape; semiconductor storage such as solid state disk (SSD) or flash memory; optical disc storage; or magneto-optical disc storage. A CPU may include one or more processors for processing data according to a set of programmable instructions or software stored in the memory. The functions of each processor may be provided by a single dedicated processor or by a plurality of processors. Moreover, processors may include, without limitation, digital signal processor (DSP) hardware, or any other hardware capable of executing software. An optional user interface may include any type or combination of input/output devices, such as a display monitor, keyboard, and/or mouse.

As described above, system 105 may be configured to receive data over an electronic network 160, process and analyze the data, and provide results of the analysis to client devices 130 over the electronic network 160. For example, system 105 may receive point-of-interest data from information sources 150 or elsewhere on electronic network 160. The point-of-interest data provided to system 105 from information sources 150 (or elsewhere) may include information that describes points-of-interest, including name, location (e.g., address, GPS coordinates), phone number, category/business type, description, rating, reviews, hours of operation, images, menus, price information, and web page (i.e., uniform resource locator (URL)). In one embodiment, information sources 150 may include points-of-interests. In an alternate embodiment, information sources 150 may also include aggregators of point-of-interest information, such as online directories.

System 105 may also transmit information to and from client application providers 140 over electronic network 160. Client application providers 140 may include developers of applications that utilize point-of-interest data, such as the point-of-interest data provided by information sources 150 and stored in system 105. The applications provided by client application providers 140 may be directed to, among other things, electronic mapping, restaurant reservations, hotel reservations, transportation, and city guides. Client application providers 140 may receive information, such as one or more application programming interfaces (APIs), from system 105 that enables client application providers 140 to develop applications that may utilize the querying features provided by system 105. Further, client application providers 140 may provide information to system 105 that allows system 105 to customize its querying services based on the features of the applications provided by client application providers 140. Among other things, this information provided by client application providers 140 to system 105 may include an identification of one or more dictionaries to search for point-of-interest information, a search strategy defining how queries received from users 130 should be processed, and prioritization information that defines how query results provided to client devices 130 should be ordered.

System 105 may also communicate with client devices 130 over electronic network 160. For example, system 105 may transmit information to and from client applications (e.g., provided by client application providers 140) associated with the client devices 130. For example, client devices 130 may transmit search queries over electronic network 160 to system 105. Among other things, the search queries may include one or more characters comprising terms for which a user of client devices 130 seeks information, as well as location data, user profile data, and client application customization data. System 105 may process this data and transmit one or more search results over electronic network 160 to client devices 130.

In accordance with certain embodiments, system 105 may include one or more processing engines 110, which may be configured to transmit data over electronic network 160 to and from client devices 130, client application providers 140, and information sources 150. In one embodiment, each processing engine 110 may store data received from client devices 130, client application providers 140, and information sources 150 in one or more databases 120. Databases 120 may be any suitable combination of large scale data storage devices, which may optionally include any type or combination of slave databases, load balancers, dummy servers, firewalls, back-up databases, and/or any other desired database components. Each processing engine 110 may also access data stored by databases 120 in order to process queries received from client devices 130. For example, processing engine 110 may access from databases 120 client application customization data received from client application providers 140 and point-of-interest data received from information sources 150 and use this data along with data received from client devices 130 (e.g., query terms, location data, user profile data, prioritization information) to predict a full query based on a partial query submitted by a client device 130 and execute the full query to determine one or more matching points-of-interest. After processing a query received from client device 130, processing engine 110 may transmit the query results to client device 130.

In accordance with certain embodiments, each processing engine 110 may comprise a Hadoop cluster including a Hadoop distributed file system ("HDFS") that is configured to stage input data, perform data processing, and store large-volume data output. It will be appreciated that the HDFS may include any desired number or arrangement of clustered machines, as needed to provide suitable efficiency, storage space, and/or processing power. It will be appreciated that any type of distributed processing system may be used in addition or in the alternative to a Hadoop cluster.

It will be appreciated that any suitable configuration of software, processors, and data storage devices may be selected to implement the components of system environment 100 and features of related embodiments. The software and hardware associated with system environment 100 may be selected to enable quick response to various business needs, relatively fast prototyping, and delivery of high-quality solutions and results. An emphasis may be placed on achieving high performance through scaling on a distributed architecture. The selected software and hardware may be flexible, to allow for quick reconfiguration, repurposing, and prototyping for research purposes. The data flows and processes described herein are merely exemplary, and may be reconfigured, merged, compartmentalized, and combined as desired. The exemplary modular architecture described herein may be desirable for performing data intensive analysis. A modular architecture may also be desired to enable efficient integration with external platforms, such as content analysis systems, various plug-ins and services, etc. Finally, the exemplary hardware and modular architecture may be provided with various system monitoring, reporting, and troubleshooting tools.

In accordance with certain embodiments, the components of system 105, such as processing engine 110 and databases 120, may perform various methods for providing customized query prediction and execution. System 105 may receive queries from various sources, including client applications provided by client application providers 140 and operating on client devices 130. For example, a user may search for a restaurant near the user's current location by typing the name of the restaurant or restaurant category (i.e., type of cuisine) via a query input box on a restaurant reservations application running on the user's mobile phone. In one embodiment, the query is submitted by the client device 130 over electronic network 160 to system 105 upon entry of each character of the query. Thus, in this embodiment, if a query ultimately comprises fifteen characters when completed by a user, the client device 130 will submit the query fifteen times, each submission including one more character than the previous submission. In an alternate embodiment, the client device 130 first submits the query to system 105 upon entry of the second character of the query. In another alternate embodiment, the client device 130 submits the query to system 105 each time a term of the query is completed, which may be indicated by, for example, a space between characters of the query. In still another embodiment, the query is not submitted to system 105 until the query is complete, as indicated, for example, by a user's selection of a submit or search button on the user device 130.

In addition to the characters of the query, other information may be transmitted from client device 130 over electronic network 160 to system 105 as part of the query. For example, client device 130 may send system 105 a client ID that identifies the client application used to submit the query, a request ID that uniquely identifies the query, a user profile used to customize the search to a particular user, location data associated with the user or client device, one or more categories associated with the query, one or more dictionary IDs that identifies dictionaries that may be searched to predict or execute a user query, a desired maximum number of results indicating the maximum number of search results that should be returned in response to the query, a device ID that identifies the user device, and a user ID that identifies the user.

In one embodiment, client device 130 may send location data along with the characters of the query. The location data may describe the identification of the client device, the user, or any other location that the user may wish to have associated with the query. Client device 130 may provide location data to system 105 in any suitable form, such as GPS coordinates, a bounded box (i.e., a geographic area designated via a rectangle or other shape drawn on a map), a centroid with radius (e.g., a GPS position and desired radius extending from the GPS position), or a street address, as well as any other means that may identify a geographic location of the user or client device 130.

According to certain embodiments, client device 130 may send one or more dictionary IDs that may identify the dictionaries that system 105 should search in order to locate points-of-interest that match the user's query. Alternatively, client application providers 140 may send on or more dictionary IDs that may identify one or more dictionaries that system 105 should search in order to locate points-of-interest that match queries submitted by users via certain client applications (e.g., the identity of a restaurant dictionary that should be searched for queries submitted via a restaurant application). In one embodiment, a dictionary may be an index or database of points-of-interest belonging to a certain category or organized according to some ordering scheme. For example, one dictionary may include all restaurants in a geographic region (e.g., city or state), whereas another dictionary may include all businesses in a city, organized by neighborhood, zip code, or street address (or alternatively, by business type).

Exemplary dictionaries that may be used for identifying point-of-interest data responsive to a user query include airport, category (e.g., hotels, Italian restaurants, most popular points-of-interest), geographic point-of-interest, franchise, points-of-interest (e.g., unabridged listing of POIs, most popular POIs), administrative area (e.g., state, county, city, postal code), address data, interpolated data, travel blogs, collections, user names, user query, and administrative area dictionaries. The same point-of-interest may be represented in more than one dictionary. For example, a restaurant may be represented in a dictionary dedicated to providing detailed information about restaurants and also in a dictionary that provides basic information for all businesses in a given geographic area. Thus, the information available for a point-of-interest in one dictionary may differ from the information available for the same point-of-interest in another dictionary. Moreover, a dictionary may include entries for points-of-interest that fall within a specific category (e.g., restaurants) and, thus, such a dictionary would not include any information for points-of-interest outside of that category.

In one embodiment, client devices 130 may send information over electronic network 160 to system 105 identifying a priority according to which search results responsive to a query should be retrieved and/or displayed. Alternatively, client application providers 140 may send this prioritization information. For example, a default prioritization scheme may provide that search results should be ordered as follows: airports, category, nearby points-of-interest, franchise, nearby administrative areas (e.g., cities, counties), other points-of-interest (i.e., not nearby), street addresses, other administrative areas (e.g., remote cities or counties). Prioritization information sent from client devices 130 or client application providers 140 may provide for search results to be transmitted to and/or displayed on client device 130 in a different order.

The prioritization scheme may indicate a maximum number of results from each category. For example, the prioritization scheme may indicate that airports are listed first in the search results, followed by categories, and then nearby points-of-interest, but that only two airports and one category may be listed in the search results. Thus, if the maximum number of results that may be displayed for a search is ten, then at least seven nearby points-of-interest may be displayed according to this scheme.

In addition to affecting the order in which search results are transmitted to and/or displayed at client device 130, the prioritization information sent by client device 130 or client application provider 140 may also affect query prediction. For example, client device 130 may send prioritization information to system 105 that indicates that certain dictionaries should be consulted before others when attempting to predict a user's query. For example, a query submitted via a restaurant reservation application is more likely to relate to a restaurant than another type of business, so a query prediction based on analysis of a restaurant dictionary are more likely to represent accurately the user's desired query than a query prediction based on a dictionary that provides information regarding all points-of-interest in a given geographic area).

In another embodiment, client device 130 may send user profile data over electronic network 160 to system 105 for use in predicting and executing queries from client device 130. User profile data may include information that system 105 may use to predict and execute queries that are more likely to return desired results for a particular user of client device 130. For example, user profile data may include a user name or ID, residential address, business address, occupation, age, and/or other information that may be used to guide the prediction and execution of search queries, such as favorite restaurants or cuisine types, maximum desired driving or walking distance to points-of-interest, favorite sports, favorite entertainment venues, etc. This information may aid with the selection of which dictionaries and which geographic areas should be searched for a user query. For example, if a user begins to type the name of a restaurant while the user is located at a friend's house (i.e., away from both home and work), user profile data for the user may cause the system to predict and execute queries for restaurants (or other points-of-interest) that are located near the friend's house (i.e. the current location of the user device), the user's home, or the user's business.

In accordance with certain embodiments, a query may be pre-processed prior to prediction and/or execution. In one embodiment, pre-processing may remove certain terms from the query prior to prediction and/or execution. For example, pre-processing of a query may remove articles and/or prepositions from the query. Alternatively, pre-processing may correct the spelling of terms prior to prediction and/or execution. Pre-processing may also convert plural terms to their singular forms and vice versa. In one embodiment, pre-processing may be performed by the client device (e.g., by the client application in which the query is being entered) prior to sending the query to system 100 for predication and/or execution. In an alternate embodiment, pre-processing may be performed by system 105 upon receipt of query information from client device 130 but prior to query prediction. In still another alternate embodiment, pre-processing may be performed by system 105 after query prediction but before query execution.

System 105 may use the information provided by client device 130 (e.g., query characters, location data, dictionary IDs, user profile data) to predict one or more full queries. As discussed above, as a user types a query into an input box within a client application running on client device 130, client device 130 may send query information to system 105. This information may be sent, for example, upon entry of each letter or upon entry of each term (e.g., at each entry of a "space" character). Upon receipt of the query information from client device 130, system 105 may predict a full query based on the partial query entered by the user. The prediction strategy implemented by system 105 for predicting such a query may depend on a variety of factors, such as location, client application customizations, and/or user profile data.

In accordance with certain embodiments, system 105 may predict a query using location data transmitted along with the characters of the partial query. In one embodiment, location data may factor into the determination of which dictionary to use to predict a full query. For example, system 105 may select a dictionary directed to point-of-interest data for businesses located in the same city as client device 130 based on the location data submitted by client device 130. Thus, if a user located in Denver types "Starb," system 105 may consult a dictionary of businesses located in Denver and predict that the user is searching for "Starbucks" in or near Denver. Alternatively, system 105 may use location data associated with a user profile submitted with a partial query to predict a full query. For example, system 105 may select a dictionary directed to point-of-interest data for businesses located in a city in which the user of client device 130 lives or works, as reflected in user profile data submitted by client device 130.

In addition to location data, query prediction may also be affected by client application customization data or user profile data sent along with a partial query. In accordance with certain embodiments, system 105 may select a dictionary corresponding to a dictionary ID included with the partial query received from client device 130 or based on user profile data included with the partial query received from client device 130. For example, client device 130 may send system 105 a dictionary ID corresponding to a restaurant dictionary upon entry of a user query into a restaurant application, and system 100 may utilize the restaurant dictionary to predict a full query.

After predicting one or more queries based on the received partial query and other information (e.g., location data, dictionary IDs, user profile data, etc.), system 105 may execute the one or more predicted full queries. As with query prediction, system 105 may use, for example, location data, dictionary IDs, and/or user profile data during query execution. By way of example, system 105 may select the dictionaries in which to run the one or more predicted queries based on the location data, dictionary IDs, and/or user profile data. In addition to this data, client device 130 may also submit prioritization data to system 105 to determine the order in which to present information for matching points-of-interest.

As discussed above, system 105 may present search results to client device 130 according to a pre-defined scheme. Alternatively, system 105 may present search results to client device 130 based on client application customizations, which may be received by system 105 from either client application providers 140 or client devices 130. Still further, system 105 may present search results to client 130 based on user customizations input into client device 130 and submitted to system 105 along with each query. As discussed above, this prioritization data—whether default, set by client application providers 140, or specific to the user of client device 130—may dictate that certain types of results are to be presented before others in the search results listing. For example, categories may be listed first, then franchise names may be presented, then individual businesses not associated with a franchise may be presented.

According to certain embodiments, search results may be transmitted to and/or displayed at client device 130 based on proximity to the user of client device 130. In one embodiment, search results may be transmitted to and/or displayed at client device 130 based on the proximity of the point-of-interest represented by each result to the client device, as reflected, for example, in the location data received from client device 130 in the query. In an alternative embodiment, search results may be transmitted to and/or displayed at client device 130 based on the proximity of the point-of-interest represented by each result to the user's home or business, as indicated, for example, in the user's profile. System 105 may determine how to order search results transmitted to client device 130 based on information received from the user, for example, in the user's profile. For example, a user's profile may indicate that the user would like to receive search results prioritized according to the user's current location, as represented by the location data associated with client device 130 that is received by system 100 as part of the user's query. Alternatively, a user may indicate the location according to which results should be prioritized on a case-by-case basis when submitting a query. Thus, system 105 may prioritize and transmit search results to a user based on proximity to the user's current location in one instance, based on proximity to the user's home in another instance, and based on proximity to the user's business in yet another instance.

In accordance with certain embodiments, system 105 may identify search results matching a query based on a radius about the user's current location, home, or business. For example, system 105 may identify points-of-interest within a specified radius of the user's current location (e.g., as reflected by the location data received from client device 130 as part of the query) that match the characters of the query. In some embodiments, system 105 may transmit to client device 130 data associated with points-of-interest within the specified radius only. In other embodiments, system 105 may transmit data associated with points-of-interest located outside the specified radius, but prioritize those points-of-interest from within the radius higher than those outside of the radius.

In some embodiments, a default radius may be predefined by system 105. In other embodiments, client application providers 140 may transmit a pre-defined radius to system 105 to be associated with each application. For example, one provider may specify that searches for a point-of-interest performed using one application should return results located within five miles of a chosen location (e.g., user's current location, home, or business). Another provider may specify that searches for a point-of-interest performing using another application should return results located within one hundred miles of a chosen location. Different radii may be appropriate for different applications based, for example, on the types/categories of points-of-interest to which the applications are directed. For example, an application directed to historic landmarks may benefit from a wider search radius than an application directed to restaurants/hotel reservations because historic landmarks are likely to be less sparsely located within a given geographic area. Moreover, the radius may be changed by the user of client device 130 by the user designating a preferred radius with the user's profile. Alternatively, the user may specify a desired radius within which to search on a case-by-case basis (i.e., per query). In one embodiment, the radius—whether default, set by the client application provider, or user—may be expanded if an insufficient number of results are obtained by system 105 in response to the query. Accordingly, a threshold value may indicate what constitutes a sufficient number of results. This threshold value may also be default, set by client application provider 140, or by a user of client device 130.

In accordance with certain embodiments, system 105 deduplicates the identified search results prior to transmitting data associated with the search results to client device 130. For example, system 105 may search several dictionaries to obtain search results responsive to a query. If a point-of-interest is represented in more than one of those dictionaries, then more than one search result may be obtained for the same point-of-interest. In some embodiments, system 105 may provide separate search results for each of the located entries (e.g., one result with data from dictionary A and one result with data from dictionary B). In other embodiments, system 105 may provide only one search result for the point-of-interest. Thus, system 105 may access the information associated with the point-of-interest from dictionary A and dictionary B, merge the information, and provide a consolidated result to client device 130. For example, if dictionary A only has information describing the name and address for a point-of-interest, and dictionary B has a phone number for the point-of-interest outputting search results, then the phone number from dictionary B will be added to the name and address from dictionary A and transmitted to client device 130 as a consolidated result. Alternatively, system 105 may determine which of dictionaries A and B has more complete information for a point-of-interest and transmit only the information received from the dictionary that has the more complete information.

After identifying one or more matching points-of-interest, system 105 may send information associated with each point-of-interest to client device 130. In certain embodiments, system 105 may send, for each identified point-of-interest, a unique ID for the result, a dictionary ID (corresponding to the dictionary(ies) from which the information provided for the result was obtained), a query ID (identifying the original query for which the result is being provided), a result type (e.g., POI, address, administrative area), center, boundary, geographic address, category (e.g., restaurant, hotel, park), display string (i.e., information that may be displayed to the user via client device 130), and images. The display string may include, among other things, a result name, street address, city, state, postal code, category, rating, reviews, description, menu, hours of operation, directions, average price, price range, and any other information that describes the result.

Client device 130 may display the search results received from system 100 accordingly to a specified order. For example, client device 130 may display the search results in the order in which those are received from system 105. Alternatively, client device 130 may reorder the search results according to a prioritization scheme associated with client device 130. In embodiments in which the original query from client device 130 included prioritization information, or in which the client application provider 140 previously transmitted prioritization information to system 105, the results should be in the appropriate order when they are received from system 105. Thus, no further reordering of search results should be necessary.

According to certain embodiments, client device 130 displays sufficient details for each search result returned from a predicted query that the user is able to obtain the desired information without finishing and submitting the full query. For example, as the user is typing the query, client device 130 may transmit to system 105 one or more partial queries, which system 105 will use to predict and execute one or more full queries. System 105 may obtain results for the one or more full queries and provide those results to client device 130 prior to receiving a full query from client device 130. Moreover, the information displayed by client device 130 for each result may provide sufficient detail regarding the result that the user does not need to complete the query and submit the full query and/or select a result to obtain the information that the user seeks.

Figure 2:
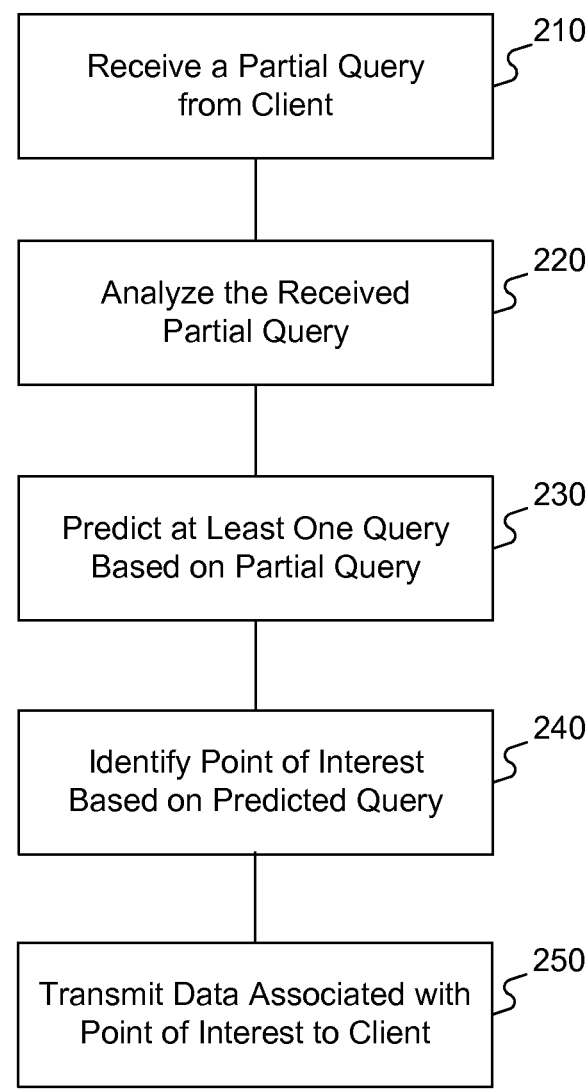
FIG. 2 is a flow diagram depicting exemplary steps of a process for providing customized query prediction, in accordance with an embodiment of the present disclosure.

FIG. 2 depicts an exemplary flow of a process 200 for providing customized query prediction and execution, in accordance with an embodiment of the present disclosure. The steps associated with this exemplary process may be performed by the components of FIG. 1. For example, the steps associated with the exemplary process of FIG. 2 may be performed by processing engine 110 and/or databases 120 of system 105 illustrated in FIG. 1.

In step 210, a partial query may be transmitted over network 160 from client device 130 and received at system 105. The partial query may comprise a plurality of characters associated with a fully query and location data associated with the client device 130 (or a user of client device 130). The location data may be represented by a bounded box, global positioning system (GPS) coordinates, or a centroid and radius. In some embodiments, receiving a partial query transmitted over network 160 from client device 130 may comprise receiving at least one dictionary ID and analyzing the received partial query using at least one dictionary may comprise analyzing the received partial query using at least one dictionary associated with the at least one dictionary ID. In other embodiments, receiving a partial query transmitted over a network 160 from a client device 130 may comprise receiving a profile associated with client device 130 (or a user of client device 130). In such cases, analyzing the received partial query using at least one dictionary may comprise selecting at least one dictionary based on the profile and analyzing the at least one query using the at least one selected dictionary.

According to certain embodiments, after the partial query is received in step 210, the received partial query may be pre-processed. Pre-processing may comprise, among other things, identifying, from the plurality of characters, a plurality of terms, removing any articles from the identified plurality of terms, removing prepositions from the identified plurality of terms, and converting any plural terms in the identified plurality of terms to their singular form. In these embodiments, analyzing the received partial query using at least one dictionary may comprise analyzing the pre-processed received partial query using at least one dictionary.

At step 420, system 105 may analyze the received partial query using at least one dictionary. For example, processing engine 110 may analyze the received partial query using at least one dictionary stored in database 120. In some embodiments, analyzing the received partial query using at least one dictionary may comprise selecting at least one dictionary based on the location data received with the partial query and analyzing the at least one query using the at least one selected dictionary. Moreover, in some embodiments, the at least one dictionary may be selected form the group consisting of an address data dictionary, interpolated data dictionary, category dictionary, point-of-interest dictionary, franchise dictionary, and administrative area dictionary. In some embodiments, analyzing the received partial query using at least one dictionary may comprise determining that the received partial query includes at least a portion of a street address, selecting at least one dictionary that associates points-of-interest with street addresses, and locating a point-of-interest that matches the street address represented by the received partial query. Moreover, in certain embodiments, analyzing the received partial query using the at least one dictionary may begin upon receipt of a partial query comprising at least two characters.

At step 230, system 105 may predict at least one query based on the analysis of the received partial query. Then, at step 240, system 105 may identify at least one point-of-interest may be identified based on the at least one predicted query. In some embodiments, identifying at least one point-of-interest based on the at least one predicted query may comprise identifying at least one point-of-interest located within a pre-defined radius of the client based on the location data associated with the client.

Data associated with the at least one identified point-of-interest may be transmitted by system 105 over network 160 to client device 130, at step 250, prior to receiving the full query from client device 130. In some embodiments, transmitting data associated with the at least one identified point-of-interest over network 160 to client device 130 prior to receiving the full query from client device 130 may comprise transmitting a name, address, and/or phone number associated with the at least one identified point-of-interest over the network to the client prior to receiving the full query from the client. In other embodiments, a plurality of points-of-interest may be identified based on the at least one predicted query and search results associated with the plurality of identified points-of-interest may be transmitted over the network to the client prior to receiving the full query from the client. Moreover, according to certain embodiments, the plurality of identified points-of-interest may be deduplicated, and search results associated with the deduplicated points-of-interest may be transmitted to the client.

According to certain embodiments, the plurality of identified points-of-interest may be prioritized by system 105 prior to transmission to client device 130. Thus, the search results for the plurality of identified points-of-interest may be transmitted from system 105 to client device 130 based on the priority of each of the plurality of identified points-of-interest. In some embodiments, receiving a partial query transmitted over network 160 from client device 130 may comprise receiving prioritization data including a priority according to which search results provided to the client should be ordered. Prioritizing the plurality of identified points-of-interest may comprise prioritizing the plurality of identified points-of-interest based on the received prioritizing data. In some embodiments, the plurality of points-of-interest may be prioritized based on at least one of airport code, category, and/or franchise.

Certain embodiments may comprise system 105 identifying at least one category based on the at least one predicted query. In these embodiments, an identification of the at least one category may be transmitted from system 105 to client device 130 prior to system 105 receiving the full query from client device 130. Other embodiments may include system 105 determining a path connecting client device 130 (or a user associated with client device 130) to the at least one identified point-of-interest based on the location data received from client device 130 and location data associated with the at least one identified point-of-interest. In these embodiments, a set of directions may be generated representing the determined path and the generated set of directions may be transmitted from system 105 to client device 130 prior to system 105 receiving a full query from client device 130.

Figure 3:
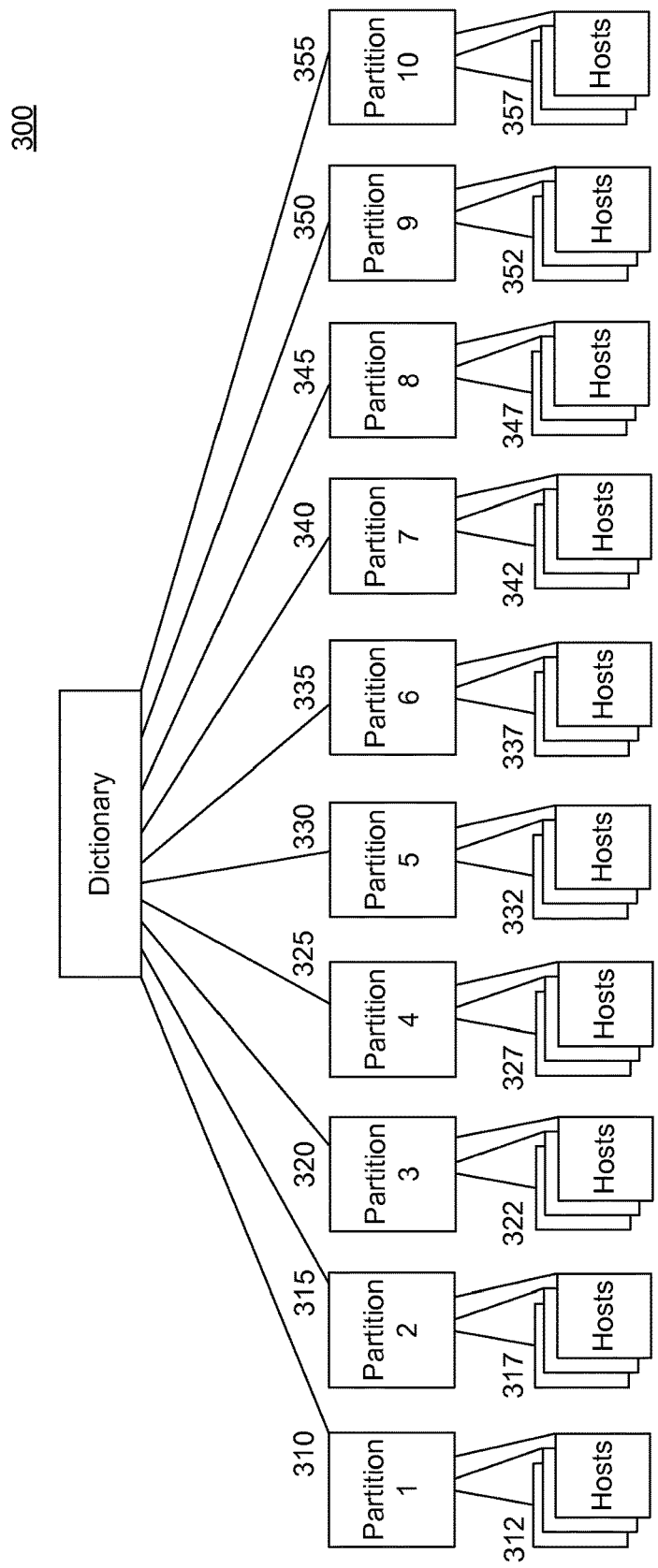
FIG. 3 is a diagram of another exemplary system environment for implementing embodiments consistent with the present disclosure.

FIG. 3 depicts an exemplary architecture 300 of a system for providing customized query prediction and execution, in accordance with an embodiment of the present disclosure. In particular, FIG. 3 depicts an exemplary structure 300 of a dictionary used by system 105 for storing point-of-interest data. In some embodiments, the components of FIG. 3 may provide a subset of the functionality of system 105 of FIG. 1. For example, the components of FIG. 3 may replace certain databases 120 of system 105 in FIG. 1.

System 105 may utilize several dictionaries to store information. For example, system 105 may include dictionaries for address data, interpolated data, point-of-interest data, franchise data, and/or administrative area data, among other data, as discussed above. The volume of data stored in a dictionary and the number of queries performed on the dictionary may create inefficiencies if either becomes too great. For example, an address data dictionary may store information corresponding to every address (e.g., business, residential, government) in the United States for which geographic location data (e.g., latitude and longitude coordinates) is known. An interpolated data dictionary may store information corresponding to every address in the United States for which geographic data is unknown, and, thus, must be interpolated based on known geographic data associated with nearby addresses. The quantity of information associated with this data, as well as the number of queries for street addresses, may cause the servers that store the data in these dictionaries to perform slowly if the storage of data is not structured efficiently. Accordingly, these dictionaries, among others, may be divided into a plurality of partitions, which may further be replicated on multiple hosts.

FIG. 3 depicts a dictionary 305 that is divided into ten partitions (i.e., partitions 310, 315, 320, 325, 330, 335, 340, 345, 350, 355). Data associated with each of the ten partitions is replicated on three hosts (i.e., hosts 312, 317, 322, 327, 332, 337, 342, 347, 352, 357). One of ordinary skill would understand that the number of partitions and hosts per partition depicted in FIG. 3 is exemplary and any appropriate number of partitions and hosts per partition may be selected based, for example, on the data volume and query volume associated with dictionary 305. Each host may be a physical host or a virtual host. For example, each host may be a separate physical host, such as a separate server or database. Alternatively, each host may be a virtual host, such that one or more hosts may be implemented on the same server or database. More specifically, virtual hosts associated with one partition (e.g., partition 310) may be implemented on the same physical server or database as virtual hosts associated with other partitions (e.g., partition 315).

Figure 4:
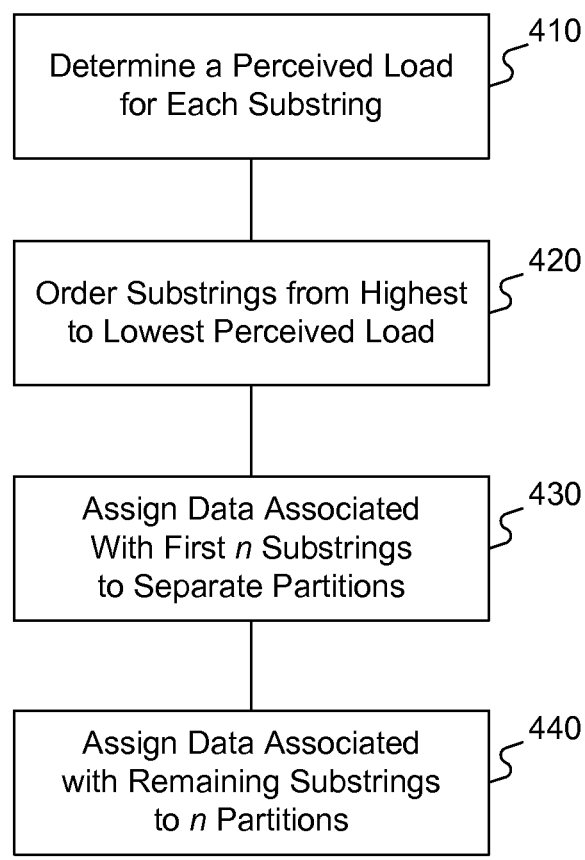
FIG. 4 is a flow diagram depicting exemplary steps of a process for distributing data among partitions, in accordance with an embodiment of the present disclosure.

FIG. 4 depicts an exemplary flow of a process 400 for distributing data among partitions, in accordance with an embodiment of the present disclosure. The steps associated with this exemplary process may be performed by the components of FIG. 1. For example, the steps associated with the process may be performed by processing engine 110 and/or databases 120 of system 105 illustrated in FIG. 1.

As shown in FIG. 4, a perceived load is determined for each of a plurality of substrings in step 410. According to certain embodiments, each of the plurality of substrings corresponds to one or more entries in dictionary 305 and/or database 120. In one embodiment, each of the plurality of substrings may correspond to the numerical portion of a street address stored in an address data dictionary. For example, each substring may correspond to the first two digits of the building number in a street address. Thus, an entry for "123 Main Street" in the address data dictionary may be represented by the substring "12." Moreover, any other street address with "12" as the first two digits of its building number may be represented by the substring "12." Building numbers that have only one digit may be represented by the digit followed by a blank character (e.g., "1_").

In an alternate embodiment, each of the plurality of substrings may correspond to letters in a street name of a street address stored in an interpolated data dictionary. For example, each substring may correspond to the first two characters of the street name in a street address. Thus, an entry for "124-140 Main Street" in the interpolated data dictionary may be represented by the substring "MA," which may be case sensitive or case insensitive. Moreover, any other street address with "MA" as the first two characters of its street name may be represented by the substring "MA." Street names that have only one character (e.g., "K Street") may be represented by the character followed by a blank character (e.g., "K_").

According to certain embodiments, the perceived load for a substring may be a value that represents an expected utilization of a dictionary or database associated with entries corresponding to the substring. In some embodiments, the perceived load for a substring may be calculated based on one or both of a data volume associated with the substring and a query volume associated with the substring. The data volume associated with the substring may be a value that represents the amount of data stored in the dictionary that corresponds to the substring (e.g., all street addresses that begin with the substring "12"). The query volume associated with the substring may be a value that represents the actual or expected number of queries performed that begin with the substring (e.g., the number of queries for street address that begin with the substring "12").

In some embodiments, the perceived load for a substring may be calculated as a factor of the square root of the query volume associated with the substring and the square root of the data volume associated with the substring. For example, the perceived load for a substring may be calculated according to the formula: perceived_load=SQRT(query_volume+1)*SQRT(data_volume+1)+(query_volume/100). This method of calculating the perceived load of a substring may be particularly suited for substrings associated with entries in an interpolated data dictionary. Because each entry in an interpolated data dictionary may represent a range of addresses, the data volume associated with each entry may vary more greatly by entry than in the address data dictionary, wherein each entry corresponds to one specific geographic location.

In some embodiments, the perceived load for a substring may be calculated as the square root of the query volume associated with the substring. Such an approach may be particularly suited for determining a perceived load of a substring associated with an address book dictionary.

In step 420, the plurality of substrings may be ordered from highest to lowest perceived load. The data stored in a dictionary may be partitioned on a substring-by-substring basis, from the substring with the highest perceived load to the substring with the lowest perceived load. Thus, at step 430, data associated with the substrings having the highest perceived loads is assigned to each partition. For example, if the dictionary is divided into ten partitions, data associated with the ten substrings with the highest perceived loads may be distributed among the ten partitions.

After each partition is assigned one load from among the substrings with the highest perceived loads, the assignment of data associated with each of the remaining substrings proceeds at step 440 on a substring-by-substring basis from the remaining substring with the highest perceived load to the remaining substring with the lowest perceived load. In some embodiments, each of the remaining substrings is assigned to a partition based on a score. Thus, with this approach, upon assignment of each substring, a score is calculated for every partition. Accordingly, if there are one hundred substrings and ten partitions, with ninety substrings remaining after the first ten are assigned, then a score may be calculated for each partition ninety times.

According to certain embodiments, the score for a partition may be calculated based on one or both of a load variance for the partition and an entropy value for the partition with respect to the candidate substring (i.e., the substring currently being assigned). The load variance may be calculated based on the difference between the total load for the partition and the average load across all partitions. The entropy value for a candidate substring with respect to a partition may be determined by comparing the first character in the candidate substring with the first character of each substring assigned to the partition. A candidate substring whose first character is different from the first character of all or most substrings currently assigned to a partition will have a higher entropy value. In one embodiment, a combined score is calculated for each partition by combining the load variance for the partition with an entropy weight (e.g., an inverse of the entropy value for the partition with respect to the candidate substring). The candidate substring may be assigned to the partition that has the lowest combined score. This process may be repeated until each substring (and the data associated therewith) is assigned a partition.

The data assigned to each partition may be replicated on multiple hosts, each of which may be physical or virtual, as discussed above. This may ensure that several hosts are available for handling queries associated with a particular partition of a dictionary, in the event that there is a surge in queries for data assigned that that partition.

In the preceding specification, various exemplary embodiments and features have been described with reference to the accompanying drawings. It will, however, be evident that various modifications and changes may be made thereto, and additional embodiments and features may be implemented, without departing from the broader scope of the invention as set forth in the claims that follow. The specification and drawings are accordingly to be regarded in an illustrative rather than restrictive sense.

For example, advantageous results still could be achieved if steps of the disclosed techniques were performed in a different order and/or if components in the disclosed systems were combined in a different manner and/or replaced or supplemented by other components. Moreover, while embodiments of the present disclosure have been described with reference to the processing of point-of-interest data, embodiments of the present disclosure may be applied to process and ingest other types of data. Other implementations are also within the scope of the following exemplary claims.

Therefore, it is intended that the disclosed embodiments and examples be considered as exemplary only, with a true scope of the present disclosure being indicated by the following claims and their equivalents.

What is claimed is:

1. A method comprising:
   determining, by one or more processors, a perceived load for each of a plurality of substrings,
      each of the plurality of substrings corresponding to one or more entries in a database used for information retrieval,
      the perceived load for each of the plurality of substrings being based on at least one of a query volume associated with each of the plurality of substrings or a data volume associated with each of the plurality of substrings;
   ordering, by the one or more processors, the plurality of substrings from a highest perceived load to a lowest perceived load;
   distributing, by the one or more processors, a quantity of substrings having the highest perceived load to a plurality of partitions in the database,
      each partition of the plurality of partitions being assigned data associated with the quantity of substrings having the highest perceived load,
      the quantity of substrings being greater than one;
   assigning, by the one or more processors, data associated with each of a remaining quantity of substrings, of the plurality of substrings, to the plurality of partitions in the database,
      the data associated with each of the remaining quantity of substrings being assigned to the plurality of partitions in the database on a substring-by-substring basis;
   assigning, by the one or more processors, data associated with a candidate substring, of the remaining quantity of substrings,
      where assigning the data associated with the candidate substring comprises:
         calculating, by one or more processors and for each partition, a load variance;
         calculating, by the one or more processors and for each partition, an entropy weight for the candidate substring;
         calculating, by the one or more processors, a combined score for each partition by combining the load variance and the entropy weight for the candidate substring; and
         assigning, by the one or more processors, the candidate substring to a particular partition, of the plurality of partitions, that has a lowest combined score;
   receiving, by the one or more processors, a partial query from a client device;
   utilizing, by the one or more processors, the database to determine a complete query and to generate search results based on the partial query; and
   providing, by the one or more processors, the search results to the client device.

2. The method of claim 1, wherein each of the plurality of substrings comprises two characters.

3. The method of claim 2, wherein each character in the plurality of substrings is a number.

4. The method of claim 2, wherein each character in the plurality of substrings is a letter.

5. The method of claim 1, wherein calculating the load variance for each partition comprises calculating a difference between a total load for each partition and an average load across the plurality of partitions.

6. The method of claim 1, wherein calculating the entropy weight for the candidate substring comprises comparing a first character in the candidate substring and a first character of each of the plurality of substrings assigned to each partition.

7. The method of claim 1, wherein each partition of the plurality of partitions is assigned one load from among the quantity of substrings with the highest perceived load.

8. A system comprising:
   a memory device that stores a set of instructions; and
   at least one processor, in communication with the memory device and configured to execute the set of instructions, to:
      determine a perceived load for each of a plurality of substrings,
         each of the plurality of substrings corresponding to one or more entries in a database used for information retrieval,
         the perceived load for each of the plurality of substrings being based on at least one of a query volume associated with each of the plurality of substrings or a data volume associated with each of the plurality of substrings;

order the plurality of substrings from a highest perceived load to a lowest perceived load;
distribute a quantity of substrings having the highest perceived load to a plurality of partitions in the database,
   each partition of the plurality of partitions being assigned data associated with the quantity of substrings having the highest perceived load;
assign data associated with each of a remaining quantity of substrings, of the plurality of substrings, to the plurality of partitions in the database,
   the data associated with each of the remaining quantity of substrings being assigned to the plurality of partitions in the database on a substring-by-substring basis;
assign data associated with a candidate substring, of the remaining quantity of substrings,
   where, when assigning the data associated with the candidate substring, the at least one processor is to:
      calculate, for each partition, a load variance;
      calculate, for each partition, an entropy weight for the candidate substring;
      calculate a combined score for each partition by combining the load variance and the entropy weight for the candidate substring; and
      assign the candidate substring to a particular partition, of the plurality of partitions, that has a lowest combined score;
receive a partial query from a client device;
utilize the database to determine a complete query and to generate search results based on the partial query; and
provide the search results to the client device.

9. The system of claim 8, wherein each of the plurality of substrings comprises two characters.

10. The system of claim 9, wherein each character in the plurality of substrings is a number.

11. The system of claim 9, wherein each character in the plurality of substrings is a letter.

12. The system of claim 8, wherein, when calculating the load variance for each partition, the at least one processor is to:
calculate a difference between a total load for each partition and an average load across the plurality of partitions.

13. The system of claim 8, wherein, when calculating, for each partition, the entropy weight for the candidate substring, the at least one processor is to:
compare a first character in the candidate substring with a first character of each of the plurality of substrings assigned to each partition.

14. The system of claim 8, wherein each partition of the plurality of partitions is assigned one load from among the quantity of substrings with the highest perceived load.

15. A computer-readable storage medium for storing a set of instructions, the set of instructions comprising:
one or more instructions that, when executed by one or more processors of a device, cause the one or more processors to:
   determine a perceived load for each of a plurality of substrings,
      each of the plurality of substrings corresponding to one or more entries in a database used for information retrieval,
      the perceived load for each of plurality of substrings being based on at least one of a query volume associated with each of the plurality of substrings or a data volume associated with each of the plurality of substrings;
   order the plurality of substrings from a highest perceived load to a lowest perceived load;
   distribute a quantity of substrings having the highest perceived load to a plurality of partitions in the database,
      each partition of the plurality of partitions being assigned data associated with the quantity of substrings having the highest perceived load,
      the quantity of substrings being greater than one;
   assign data associated with each of a remaining quantity of substrings, of the plurality of substrings, to the plurality of partitions in the database,
      the data associated with each of the remaining quantity of substrings being assigned to the plurality of partitions in the database on a substring-by-substring basis;
   assign data associated with a candidate substring of the remaining quantity of substrings,
      wherein the one or more instructions that cause the one or more processors to assign the data associated with the candidate substring cause the one or more processors to:
         calculate, for each partition, a load variance;
         calculate, for each partition, an entropy weight for the candidate substring;
         calculate a combined score for each partition by combining the load variance and the entropy weight for the candidate substring; and
         assign data associated with the candidate substring to a particular partition, of the plurality of partitions, that has a lowest combined score;
   receive a partial query from a client device;
   utilize the database to determine a complete query and to generate search results based on the partial query; and
   provide the search results to the client device.

16. The computer-readable storage medium of claim 15, wherein each of the plurality of substrings comprises two characters.

17. The computer-readable storage medium of claim 16, wherein each character in the plurality of substrings is a number.

18. The computer-readable storage medium of claim 16, wherein each character in the plurality of substrings is a letter.

19. The computer-readable storage medium of claim 15, wherein the set of instructions further comprise:
one or more instructions that, when executed by the one or more processors, cause the one or more processors to:
   calculate the load variance, for each partition, by calculating a difference between a total load for each partition and an average load across the plurality of partitions.

20. The computer-readable storage medium of claim 15, wherein the set of instructions further comprise:
one or more instructions that, when executed by the one or more processors, cause the one or more processors to:
   calculate, for each partition, the entropy weight for the candidate substring by comparing a first character in the candidate substring and a first character of each of the plurality of substrings assigned to each partition.

21. The computer-readable storage medium of claim 15, wherein each partition of the plurality of partitions is assigned one load from among the quantity of substrings with the highest perceived load.

* * * * *